США010597940B2

United States Patent
Lemaitre et al.

(10) Patent No.: US 10,597,940 B2
(45) Date of Patent: Mar. 24, 2020

(54) MOTOR-DRIVEN CONTROL DEVICE FOR CONTROLLING A MOVABLE SCREEN CONSISTING OF A WINDABLE CANVAS OF A WINDOW-COVERING DEVICE OR PROJECTION SCREEN

(71) Applicant: SOMFY SAS, Cluses (FR)

(72) Inventors: Sébastien Lemaitre, Cluses (FR); Julien Peillex, Cluses (FR)

(73) Assignee: SOMFY SAS, Cluses (FR)

( * ) Notice: Subject to any disclaimer, the term of this patent is extended or adjusted under 35 U.S.C. 154(b) by 227 days.

(21) Appl. No.: 14/408,040

(22) PCT Filed: Jun. 13, 2013

(86) PCT No.: PCT/EP2013/062300
§ 371 (c)(1),
(2) Date: Dec. 15, 2014

(87) PCT Pub. No.: WO2013/186321
PCT Pub. Date: Dec. 19, 2013

(65) Prior Publication Data
US 2015/0136338 A1    May 21, 2015

(30) Foreign Application Priority Data

Jun. 13, 2012   (FR) ..................... 12 55524

(51) Int. Cl.
*E06B 9/72*        (2006.01)
*H02K 5/04*        (2006.01)
(Continued)

(52) U.S. Cl.
CPC ................. *E06B 9/72* (2013.01); *E06B 9/42* (2013.01); *H02K 5/04* (2013.01); *H02K 11/33* (2016.01);
(Continued)

(58) Field of Classification Search
CPC ..... E06B 9/42; E06B 9/72; E06B 9/50; E06B 2009/725; E06B 9/68; E06B 9/56;
(Continued)

(56) References Cited

U.S. PATENT DOCUMENTS

| 3,998,516 A | 12/1976 | Mabuchi |
| 4,265,320 A | 5/1981 | Tanaka et al. |

(Continued)

FOREIGN PATENT DOCUMENTS

| DE | 40 38 419 A1 | 6/1991 |
| DE | 298 18 023 U1 | 12/1998 |

(Continued)

OTHER PUBLICATIONS

Office Action dated Sep. 26, 2019 in co-pending U.S. Appl. No. 14/755,688; with PTO-892; without returned SB08 (6 pages) (US20190106938 and US20180106105 cited in the Office Action are not listed since they have a later effective date) (Year: 2019).*

(Continued)

*Primary Examiner* — Katherine W Mitchell
*Assistant Examiner* — Jeremy C Ramsey
(74) *Attorney, Agent, or Firm* — Seckel IP, PLLC

(57) ABSTRACT

Motorized manoeuvring device (1) intended to manoeuvre a moving windable fabric screen (3), the motorized manoeuvring device comprising:
an actuator (4), comprising a hollow housing (41) containing a gear motor,
a mounting end-plate (7a),
characterized in that the end-plate (7a) comprises a first support (11) extending from the end-plate along a first longitudinal axis (X-X') and cooperating with the housing (41) of the actuator (4) and in that it comprises a second support (12) extending from the end-plate along a second axis distinct from the first (Ya-Ya', Z-Z') and in that the (Continued)

hollow housing, notably the tubular hollow housing, of the actuator, is closed by the first end-plate support.

28 Claims, 4 Drawing Sheets

(51) Int. Cl.
    *H02K 11/33*     (2016.01)
    *E06B 9/42*     (2006.01)
    *H02K 5/22*     (2006.01)
    *E06B 9/50*     (2006.01)

(52) U.S. Cl.
    CPC ............... *E06B 9/50* (2013.01); *H02K 5/225* (2013.01); *H02K 2207/03* (2013.01)

(58) Field of Classification Search
    CPC .... E06B 9/54; E06B 9/74; H02K 5/04; H02K 2207/03
    USPC ......................................... 160/310, 311, 243
    See application file for complete search history.

(56) References Cited

U.S. PATENT DOCUMENTS

| | | | |
|---|---|---|---|
| 4,615,371 A | 10/1986 | Clauss | |
| 4,751,953 A * | 6/1988 | Appel | E06B 9/50 |
| | | | 160/313 |
| 4,997,022 A | 3/1991 | Klein | |
| 5,029,629 A | 7/1991 | Cheng-Pei | |
| 5,148,849 A | 9/1992 | Faludy | |
| 6,060,852 A | 5/2000 | Domel et al. | |
| 6,158,563 A | 12/2000 | Welfonder et al. | |
| 6,189,592 B1 | 2/2001 | Domel | |
| 6,421,175 B1 | 7/2002 | Shopp | |
| 6,628,029 B2 | 9/2003 | Astegno | |
| 6,843,301 B2 | 1/2005 | Carrillo et al. | |
| 6,979,962 B2 | 12/2005 | Cavarec et al. | |
| 7,057,360 B1 | 6/2006 | Hsu | |
| 7,231,953 B2 | 6/2007 | Varley et al. | |
| 7,234,503 B2 | 6/2007 | Kwak | |
| 7,237,592 B2 | 7/2007 | Arnoux et al. | |
| 7,549,458 B2 | 6/2009 | Kwak | |
| 7,686,061 B2 | 3/2010 | Mullet et al. | |
| 7,690,694 B2 | 4/2010 | Poder | |
| 7,723,939 B2 | 5/2010 | Carmen, Jr. | |
| 7,816,028 B2 | 10/2010 | Rivetta | |
| 7,830,600 B2 | 11/2010 | Jiang | |
| 8,004,224 B2 | 8/2011 | Marchetto et al. | |
| 8,009,433 B2 | 8/2011 | Ares | |
| 8,258,993 B2 | 9/2012 | Inoue et al. | |
| 8,307,878 B2 | 11/2012 | Faller et al. | |
| 8,368,328 B2 | 2/2013 | Mullet et al. | |
| 8,371,358 B1 | 2/2013 | Mullet et al. | |
| 8,464,776 B2 | 6/2013 | Anthoine | |
| 8,513,845 B2 | 8/2013 | Angelini | |
| 8,575,872 B2 | 11/2013 | Mullet et al. | |
| 8,659,246 B2 * | 2/2014 | Mullet | E06B 9/40 |
| | | | 160/133 |
| 8,662,139 B2 | 3/2014 | Anthony et al. | |
| 8,723,454 B2 | 5/2014 | Skinner et al. | |
| 8,739,854 B2 | 6/2014 | Mullet et al. | |
| 8,776,861 B2 | 7/2014 | Bohlen et al. | |
| 8,800,633 B2 | 8/2014 | Mullet et al. | |
| 8,807,196 B2 | 8/2014 | Mullet et al. | |
| 8,919,419 B2 | 12/2014 | Mullet et al. | |
| 8,944,138 B2 | 2/2015 | Feldstein et al. | |
| 8,960,260 B2 | 2/2015 | Anderson et al. | |
| 9,018,868 B2 | 4/2015 | Lucas et al. | |
| 9,054,541 B2 | 6/2015 | Morita et al. | |
| 9,095,908 B2 * | 8/2015 | Mullet | E06B 9/72 |
| 9,334,688 B2 * | 5/2016 | Colson | E06B 9/42 |
| 10,031,305 B2 * | 7/2018 | Leeman | G02B 6/4452 |
| 2003/0015301 A1 | 1/2003 | Killo et al. | |
| 2004/0129849 A1 | 7/2004 | Walker et al. | |
| 2005/0072532 A1 | 4/2005 | Holden et al. | |
| 2005/0087313 A1 | 4/2005 | Nichols, Jr. et al. | |
| 2005/0205216 A1 | 9/2005 | Vrielink | |
| 2005/0225269 A1 * | 10/2005 | Barak | E06B 9/72 |
| | | | 318/56 |
| 2006/0086874 A1 | 4/2006 | Habel et al. | |
| 2006/0137837 A1 | 6/2006 | Costello et al. | |
| 2006/0232234 A1 | 10/2006 | Newman, Jr. | |
| 2007/0155236 A1 * | 7/2007 | Shi | H02G 3/32 |
| | | | 439/587 |
| 2008/0067278 A1 | 3/2008 | Fortunato et al. | |
| 2008/0212294 A1 * | 9/2008 | Ares | E06B 9/72 |
| | | | 361/752 |
| 2008/0230192 A1 | 9/2008 | Kane | |
| 2009/0310264 A1 | 12/2009 | Cooper et al. | |
| 2010/0078137 A1 | 4/2010 | Angelini | |
| 2010/0175838 A1 | 7/2010 | Faller et al. | |
| 2010/0200176 A1 | 8/2010 | Magli | |
| 2010/0219306 A1 | 9/2010 | Detmer et al. | |
| 2010/0269988 A1 | 10/2010 | Mullet et al. | |
| 2010/0282890 A1 * | 11/2010 | Ducornetz | E06B 9/174 |
| | | | 242/404 |
| 2011/0048655 A1 | 3/2011 | Andreasen et al. | |
| 2011/0203748 A1 | 8/2011 | Mullet et al. | |
| 2011/0265958 A1 | 11/2011 | Skinner et al. | |
| 2012/0031571 A1 * | 2/2012 | Mullet | E06B 9/40 |
| | | | 160/310 |
| 2013/0099714 A1 * | 4/2013 | Mullet | H02P 3/08 |
| | | | 318/468 |
| 2013/0105095 A1 | 5/2013 | Anderson et al. | |
| 2013/0199735 A1 * | 8/2013 | Colson | E06B 9/42 |
| | | | 160/2 |
| 2013/0220560 A1 | 8/2013 | Mullet et al. | |
| 2013/0269885 A1 * | 10/2013 | Cavarec | E06B 9/64 |
| | | | 160/311 |
| 2013/0276995 A1 | 10/2013 | Mullet et al. | |
| 2013/0285580 A1 * | 10/2013 | Mullet | E06B 9/72 |
| | | | 318/139 |
| 2013/0312920 A1 | 11/2013 | Mullet et al. | |
| 2014/0014281 A1 | 1/2014 | Mullet et al. | |
| 2014/0069595 A1 | 3/2014 | Chen | |
| 2014/0076508 A1 | 3/2014 | Mullet et al. | |
| 2014/0130989 A1 | 5/2014 | Chan et al. | |
| 2014/0133019 A1 | 5/2014 | Mullet et al. | |
| 2014/0224437 A1 | 8/2014 | Colson et al. | |
| 2014/0262067 A1 | 9/2014 | Higgins et al. | |
| 2014/0329034 A1 | 11/2014 | Taylor et al. | |
| 2014/0352893 A1 | 12/2014 | Malott | |
| 2015/0034258 A1 | 2/2015 | Bohlen et al. | |
| 2015/0034259 A1 | 2/2015 | Bohlen et al. | |
| 2015/0034260 A1 | 2/2015 | Blair et al. | |
| 2015/0075732 A1 | 3/2015 | Kirby et al. | |
| 2015/0136338 A1 * | 5/2015 | Lemaitre | E06B 9/72 |
| | | | 160/310 |
| 2015/0179994 A1 | 6/2015 | Lemaitre et al. | |
| 2015/0191973 A1 | 7/2015 | Bohlen | |
| 2015/0209525 A1 | 7/2015 | Bicknell et al. | |
| 2015/0364960 A1 | 12/2015 | Arimatsu | |
| 2017/0006740 A1 | 1/2017 | Holt et al. | |
| 2017/0241201 A1 | 8/2017 | Buccola, Jr. et al. | |

FOREIGN PATENT DOCUMENTS

| | | | | |
|---|---|---|---|---|
| DE | 102004016417 B3 | | 10/2005 | |
| DE | 102012003592 A1 | * | 8/2013 | ............... E06B 9/72 |
| EP | 0 911 479 A2 | | 4/1999 | |
| EP | 1365101 A2 | | 11/2003 | |
| EP | 1365101 A2 | * | 11/2003 | ............. E06B 9/174 |
| EP | 1898042 A2 | | 3/2008 | |
| EP | 1939390 A2 | * | 7/2008 | ............... E06B 9/72 |
| EP | 1939390 A2 | | 7/2008 | |
| EP | 1961910 A1 | | 8/2008 | |
| EP | 2148412 A1 | | 1/2010 | |
| FR | 2901304 A1 | | 11/2007 | |
| KR | 20100118723 A | | 11/2010 | |
| RU | 2418935 C2 | | 5/2011 | |

(56) References Cited

FOREIGN PATENT DOCUMENTS

| WO | 2010/101495 | A1 | 9/2010 |
|----|-------------|----|--------|
| WO | 2011/150412 | A1 | 12/2011 |
| WO | 2012/085252 | A1 | 6/2012 |

OTHER PUBLICATIONS

Office Action dated Jul. 26, 2016, issued in co-pending U.S. Appl. No. 14/755,688; with PTO-892; without returned IDS forms SB08 (15 pages).
International Search Report dated Jul. 31, 2013 issued in corresponding application No. PCT/EP2013/062300, and Writtenl Opinion; with English partial translation and partial machine translation (16 pages).
Final Office Action dated Apr. 20, 2017 in co-pending U.S. Appl. No. 14/755,688; with PTO-892; without returned SB08 (20 pages).
Final Office Action dated Apr. 20, 2017 in co-pending U.S. Appl. No. 14/755,688; with PTO-892; without returned SB08 (20 pages) (the documents other than EP2148412 cited in the Office Action are not listed in this IDS since they were already made of record in this application).
European Search Report and Written Opinion dated Jun. 13, 2016 issued in European application No. EP15174484 corresponding to co-pending CIP U.S. Appl. No. 14/755,688; with English partial translation and partial machine translation (19 pages) (documents 1-4 cited in the ESR are not listed in this IDS since they were cited in the ISR and listed in the IDS filed Dec. 15, 2014 in this application).
Office Action dated Oct. 7, 2016 issued in co-pending U.S. Appl. No. 14/408,047; with PTO-892; without returned SB08 (12 pages) (US20130099714 and US20120031571 cited in the Office Action are not listed in this IDS since they were previously cited in the Office Action dated Aug. 26, 2016 in this application).
International Search Report and Written Opinion dated Jul. 23, 2013, issued in co-pending application No. PCT/EP2013/062297, U.S. Appl. No. 14/408,047; with English partial translation and partial machine translation (16 pages).
Office Action dated Jul. 27, 2015 issued in co-pending U.S. Appl. No. 14/408,047; with PTO-892; without returned IDS forms SB08 (17 pages) (U.S. Pat. No. 6,843,301; US20130312920; US20140224437 cited in the Office Action are not listed in this IDS since they were previously cited in the IDS filed Jul. 27, 2016 in this application; US20130199735; US20130269885 cited in the Office Action are not listed in this IDS since they were previously cited in the IDS filed Dec. 15, 2014 and in the Office Action dated Aug. 26, 2016 in this application: U.S. Pat. No. 8,659,246; US20150136338 cited in the Office Action are not listed in this IDS form since they are listed in an IDS form filed concurrently in this application).
Final Office Action dated Mar. 4, 2016 issued in co-pending U.S. Appl. No. 14/408,047; with PTO-892 (16 pages) (US20120031571 cited in the Office Action is not listed in this IDS form since it was listed in the Office Action dated Aug. 26, 2016 in this application).
Advisory Action dated Jul. 13, 2016 issued in co-pending U.S. Appl. No. 14/408,047 (4 pages).
Office Action dated Mar. 21, 2018 in co-pending U.S. Appl. No. 14/755,688; with PTO-892; without returned SB08 (30 pages).
Final Office Action dated Dec. 10, 2018 in co-pending U.S. Appl. No. 14/755,688; with PTO-892; without returned SB08 (19 pages) (EP1939390 cited in the Office Action is not listed in this IDS since it was already listed in the IDS filed Dec. 27, 2016).

\* cited by examiner

MOTOR-DRIVEN CONTROL DEVICE FOR CONTROLLING A MOVABLE SCREEN CONSISTING OF A WINDABLE CANVAS OF A WINDOW-COVERING DEVICE OR PROJECTION SCREEN

The invention relates to a moving windable fabric screen installation, of the window or projection screen cover type, provided with a motorized winding element. The invention relates more specifically to a motorized manoeuvring device intended to manoeuvre a movable windable fabric screen of a window or projection screen cover device and to a window or projection screen cover device comprising such a manoeuvring device. The invention notably relates to a motorized home automation system for manoeuvring a moving screen in a conventional mounting configuration for which the winding shaft has to be kept in a fixed position relative to a frame and to a motorized manoeuvring home automation system for an inverse-mounted screen, in which the winding shaft is suspended on the fabric and therefore can be moved relative to its bearing structure (building or moving structure such as a load bar or an arm of an awning).

Such a screen is described in patent application PCT/EP11073888 (published as WO2012085252A1). In this application, the motorized manoeuvring device is intended to be suspended by the fabric and comprises:
a winding tube that moves about a first axis and on which the fabric is intended to be wound,
an actuator arranged at least partially in the tube,
a first means for fixing a first end of the fabric to the winding tube.

The weight of the manoeuvring device creates a fabric unwinding torque. The device comprises an unwinding torque neutralizing means that acts exclusively by interaction with gravity and/or with the fabric. This neutralizing means notably comprises a torque recovery bar mounted between two lateral end-plates.

In the different types of screens, the actuator is mounted inside the winding tube. The output shaft of the actuator drives the winding tube in rotation when the motor of the actuator is powered.

The actuator comprises a hollow tubular housing, closed by a part called head of the actuator. The latter is conventionally fixed onto an accessory that is itself added onto a frame, an end-plate or on a side of a casing. The winding shaft is kept free to rotate on the actuator, notably on a portion of tubular housing of the actuator.

The aim of the invention is to provide a moving screen manoeuvring device that improves the manoeuvring devices known from the prior art. In particular, the invention proposes a manoeuvring device of simple and compact architecture, involving a support element that is simple, reliable and versatile. The aim of the invention is also to provide a moving screen manoeuvring device in which the actuator is incorporated without accessories, the device itself acting as actuator head. Moreover, another aim of the invention is to provide a support element that can suit different tube-based or winding shaft-based home automation system architectures.

According to the invention, a motorized manoeuvring device is intended to manoeuvre a moving windable fabric screen. The motorized manoeuvring device comprises:
an actuator, comprising a hollow housing containing a gear motor,
an end-plate.

The end-plate comprises a first support extending from the end-plate along a first longitudinal axis and cooperating with the housing of the actuator. The end-plate comprises a second support extending from the end-plate along a second axis distinct from the first.

The first support can comprise at least one first rotation stopping element, notably at least one groove, respectively at least one rib, in particular at least one first rotation stopping element formed on a shafted part of the first support. The housing can comprise at least one second rotation stopping element, notably at least one rib, respectively at least one groove, in particular at least one second rotation stopping element formed on inner walls of the housing. The first and second rotation stopping elements cooperate to link in rotation, notably to link in rotation about the first longitudinal axis, the first support and the housing.

The end-plate and its first and second supports can be produced as a single piece.

The first support can be at least partially inserted into the hollow housing of the actuator.

The hollow housing, notably the tubular hollow housing, of the actuator can be closed by the first end-plate support.

The second support can be intended to cooperate with a torque neutralizing element acting by interaction with the fabric.

The second support can be intended to cooperate with a frame on an axis substantially at right angles to the longitudinal axis of the first support.

The end-plate can comprise a first bore intended to receive a connection and/or electronic part of the actuator, the first bore being produced inside the first support.

The end-plate can comprise a second bore on its outer lateral face and a cover intended to close this bore.

The first and the second bores of the end-plate can be connected to one another.

The end-plate can comprise a through hole between the second bore and its inner lateral face, the hole emerging outside the diameter of the hollow housing of the actuator for the entry of a cable.

A first guiding path for an electrical wire can be positioned in the second bore.

The inner lateral face of the end-plate can comprise a second guiding path for an electrical wire.

The two supports can extend from the inner lateral face of the end-plate.

The motorized device can comprise an annular surface on the inner lateral face of the end-plate against which a bearing ring mounted free to rotate about the housing of the actuator can bear.

According to the invention, a motorized home automation system comprises a motorized device as defined previously, a bearing ring rotating freely on the housing of the actuator, a winding tube, mounted to slide on the bearing ring, the bearing ring bearing on the inner face of the end-plate and a second end-plate comprising a winding tube support element.

The invention will be better understood on reading the following description, given purely as an example and with reference to the attached drawings in which.

Figure 1:
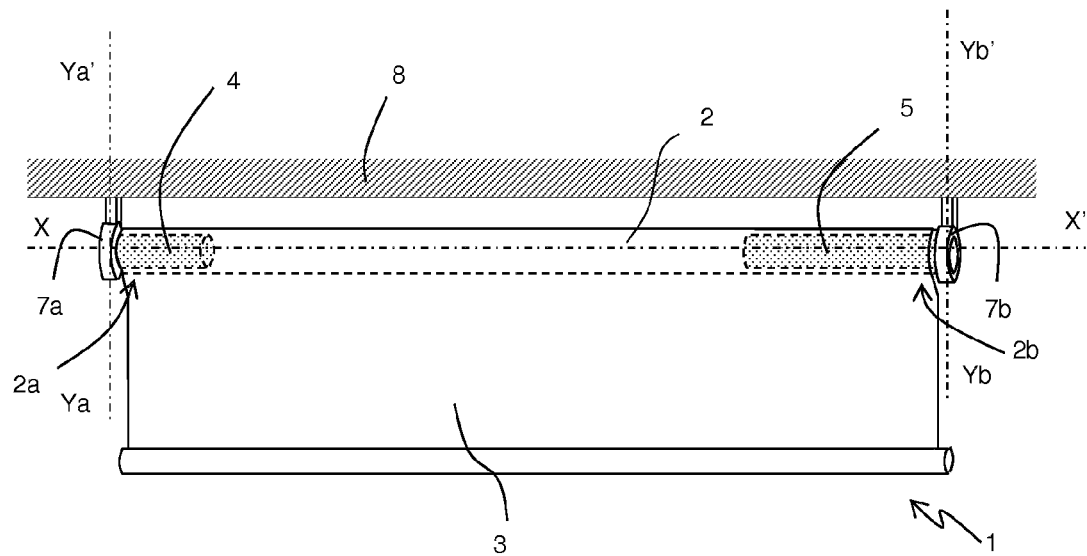
FIG. 1 is a representation of a first embodiment of a motorized home automation system for manoeuvring a moving screen in a conventional mounting configuration.

An embodiment of a motorized manoeuvring home automation system 1, represented in FIG. 1, allows for the motorized manoeuvring of a moving screen 3, notably a screen that can be wound about a winding tube 2, such as a blind. It is notably designed to be used to block or restrict the penetration of sunlight through an opening of a building.

The home automation system or motorized screen system comprises a winding tube manoeuvring actuator 4. This actuator is preferably arranged partially or totally in the winding tube. The manoeuvring actuator is said to be standalone, that is to say that it is powered by its own power supply device 5 comprising an electrical energy storage element 6. The manoeuvring actuator is inserted into the winding tube, at one of its ends, whereas the power supply device is inserted into the winding tube, at its other end.

The actuator sets the winding tube in motion in a known manner. The moving screen is attached by one of its ends to the tube. Thus, the rotation of the winding tube causes, depending on its direction, the screen to be wound onto or unwound from the tube. The actuator and the winding tube extend along a first axis X-X'.

The system 1 comprises two end-plates 7a, 7b on either side of the winding tube. These end-plates are used to hold the motorized screen system on a fixed structure or frame 8, for example a ceiling or a wall. In particular, the end-plates 7a and 7b support the winding tube on two axes Ya-Ya' and Yb-Yb', parallel to one another and at right angles to the first axis X-X'. Other configurations are also possible. In this first embodiment, the winding tube remains fixed (excluding its rotation about its axis X-X') relative to the structure of the building and the fabric is wound around this winding tube. The end-plate 7a close to the actuator is called first end-plate or motor end-plate, and the end-plate 7b at the opposite end of the tube is called second end-plate.

Figure 2:
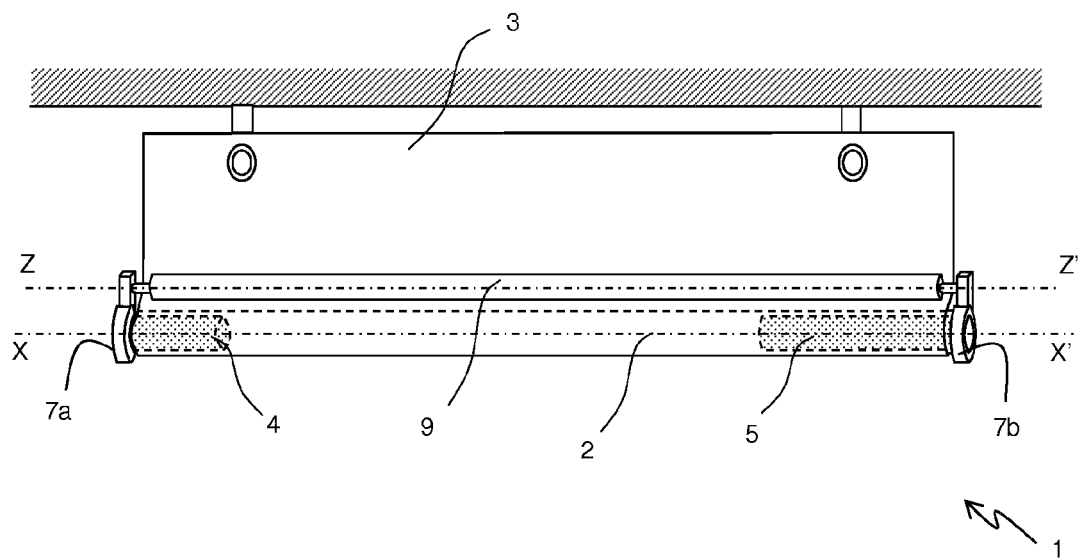
FIG. 2 is a representation of a second embodiment of a motorized home automation system for manoeuvring a moving screen in an inverse-mounted configuration.

In a second embodiment represented in FIG. 2, the motorized screen system is intended to be linked to the structure of the building exclusively by the screen, that is to say that the motorized screen system is a system suspended by the screen and in which the winding tube is translated, notably is translated vertically, as the screen is wound or unwound. Thus, all the forces exerted on the system are taken up by the screen. Preferably, there is no other contact or link between the system and the building. The end-plates 7a and 7b are then used to hold the winding tube relative to the screen, notably by virtue of a rotation torque recovery bar 9 in contact with the screen and held between the end-plates in a direction Z-Z', parallel to the axis X-X'. The other references remain unchanged.

Figure 3:
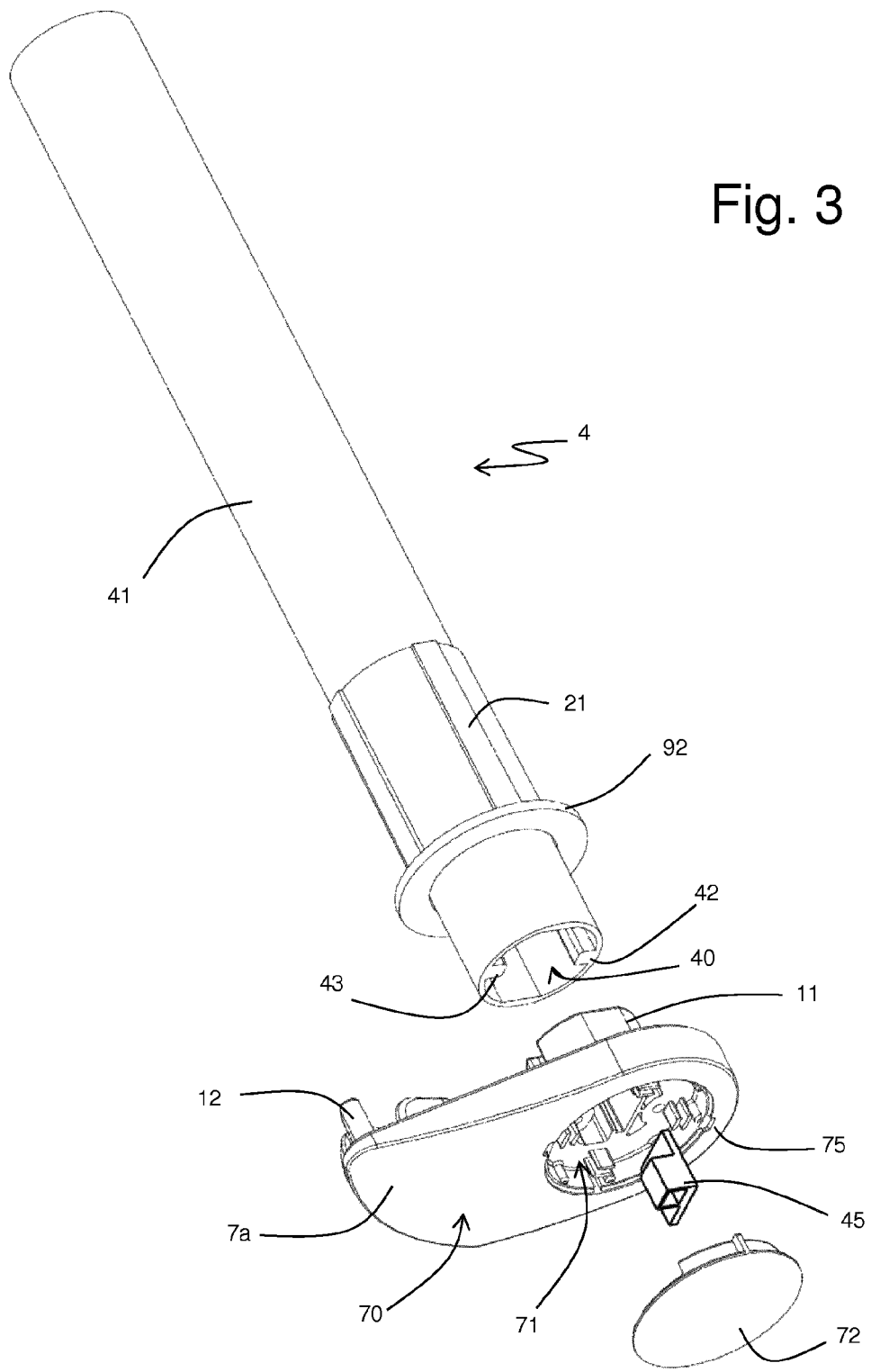
FIG. 3 represents, in an exploded view, a part of a motorized device for manoeuvring a moving screen.
Figure 4:
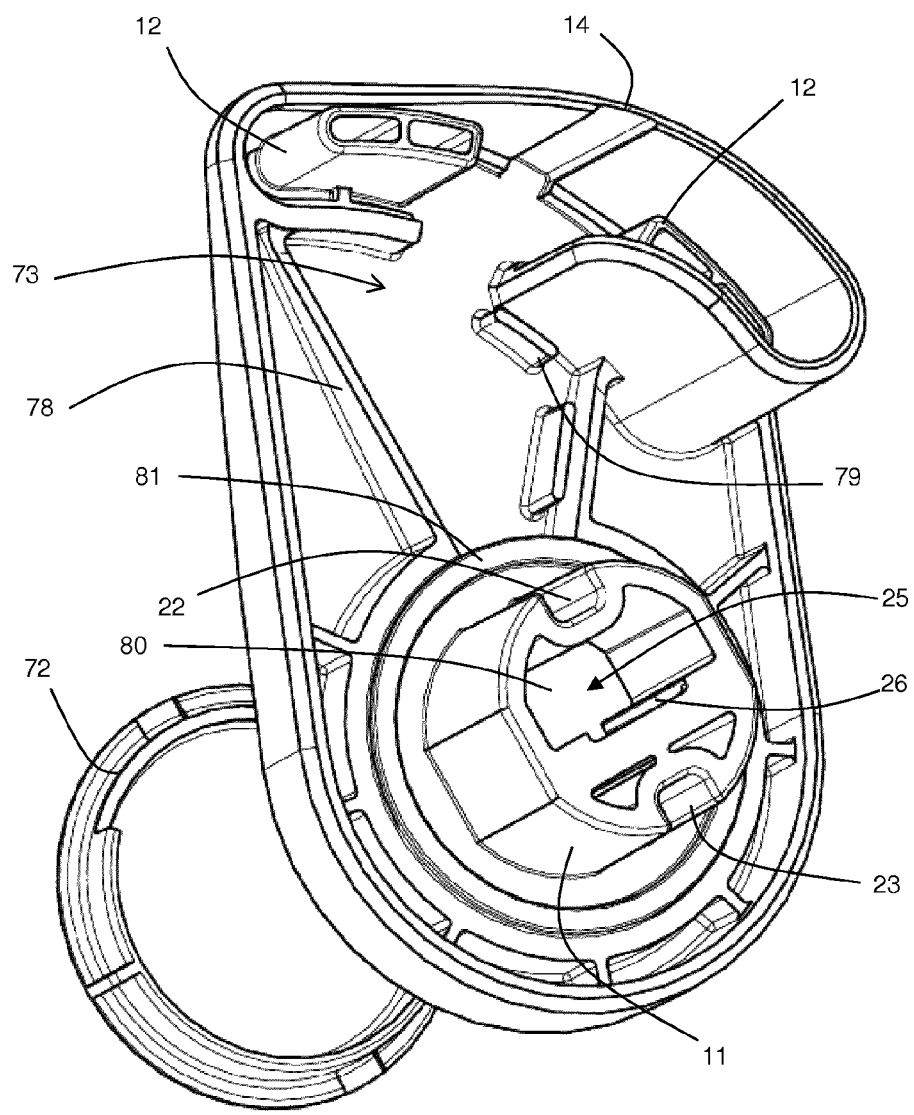
FIG. 4 represents, in perspective, a view of the outer face of an end-plate.
Figure 5:
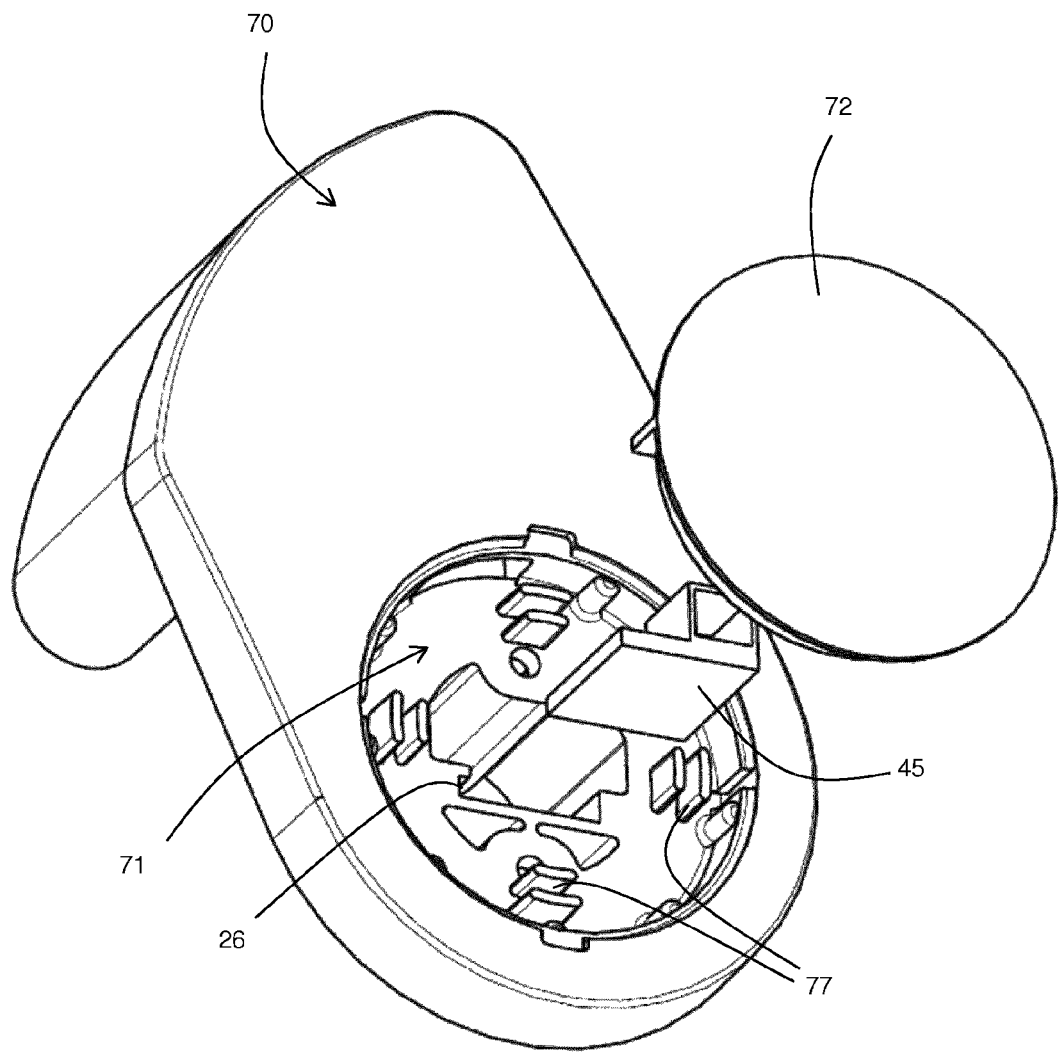
FIG. 5 represents, in perspective, a view of the inner face of the end-plate.

As represented in FIGS. 3 and 4, the actuator comprises a hollow housing 41, inside which are housed the electro-mechanical components (not represented) such as the motor, the gear, the radio receiver, the control electronics, etc.

The inner wall of the housing 40 has one or more ribs 42, 43, and planar areas 44. The planar areas can include a groove (not represented), allowing for the translational guidance of at least some of the electromechanical components, for example a printed circuit supporting the control electronics.

It should be noted that the tubular housing can comprise a closing cover (not represented), inserted into the housing to protect the electromechanical components of the actuator, and through which power supply wires enter. However, even in this case, the end of the housing is hollow.

A crown ring 21 with collar 92 is mounted to rotate freely on the housing. It serves as a bearing for the winding tube when the actuator is inserted into the tube.

The housing of the actuator is closed by the first end-plate 7a, a first support 11 of which cooperates with the hollow end of the housing of the actuator. In particular, the first support of the motor end-plate takes the form of a support shaft extending substantially at right angles to the end-plate on an inner face 71. The support shaft is provided with at least one longitudinal channel or groove 22, 23. The channels cooperate with the ribs 42, 43 formed on the inner walls of the housing of the actuator. The grooves-ribs assembly makes it possible both to guide the assembly of the housing on the support shaft and also to ensure the recovery of the rotational forces linked to the motor (torque recovery). The support shaft also comprises one or more flats 24, corresponding to the planar areas on the inner surface of the hollow housing, for this same purpose. The actuator is then slidingly mounted on the support shaft, before being translationally immobilized, if necessary, on the shaft or on the motor end-plate. Thus, the first support can comprise at least one first rotation stopping element, notably at least one groove 22, 23, respectively at least one rib, in particular at least one first rotation stopping element formed on a shafted part of the first support 1. Moreover, the housing 41 can comprise at least one second rotation stopping element 42, 43, notably at least one rib 42, 43, respectively at least one groove, in particular at least one second rotation stopping element formed on inner walls of the housing. The first and second rotation stopping elements advantageously cooperate to link in rotation, notably to link in rotation about the first longitudinal axis XX', the first support and the housing.

The motor end-plate and the tubular housing of the actuator are therefore directly linked, with no other intermediary. In particular, the actuator does not comprise any head, blocking the housing and serving as holding point. In other words, the head of the actuator is formed by the end-plate which also has a second support function, notably a support function for a torque neutralizing element or a support function for the home automation system.

The mounting thus saves in thickness: the motor end-plate itself takes up the rotational torque imparted by the actuator, by being directly connected to the hollow housing 41 or hollow body of the actuator. Thus, the winding tube and consequently the border of the fabric can be as close as possible to the inner face of the end-plate.

The support shaft is provided with a first bore 25 comprising, on its inner walls, at least one rail 26 forming a support and guiding element for an electronic control card 45 for the actuator. The latter is thus at least partially located inside the housing of the actuator when the latter is assembled on the support shaft and when the electronic card is slid along the rails inside the bore of the support shaft.

Advantageously, the bore in the support shaft is a through bore and the motor end-plate 7a also includes a through bore 71, forming an opening on the outer part 70 of the end-plate, that can be closed by a cover 72. This opening makes it possible to access in particular the electronic card without dismantling the rest of the system. In particular, the end-plate comprises notches 75, notably allowing for the passage of a tool, such as a flat screwdriver, to act, notably by a lever action, to raise the cover and access the electronic card.

The electronic card can also be provided with interface elements, for example a programming button, which can thus be accessed when the cover of the end-plate is removed, without dismantling the rest of the system. In maintenance situations, it is very simple to dismantle the system and disassemble the different parts.

The end-plate also comprises a second support element 12. The latter allows it to be fixed to a wall or a ceiling, in the first embodiment, or to the rotation torque recovery bar 9, in the second embodiment. In both embodiments, the second support element is distinct from the first support element and acts on a distinct axis.

In the first embodiment, the second support element comprises a foot which can be mounted on a wall or on a ceiling, by means of known elements such as screws, glue, magnets. The support (or the suspension) of the device on the frame is thus implemented in a direction Ya-Ya' at right angles to the axis of the winding tube X-X'.

In the example represented in FIG. 3, the second support element takes the form of a pin extending along an axis Z-Z' parallel to the axis of the first support. A number of pins can form the support element. The torque recovery bar is thus held between the second support element of the motor end-plate and the second end-plate.

The torque neutralizing element can have a hollow end whose internal diameter corresponds to that of the pin to be plugged therein and mechanically held.

In place of the torque recovery element, a connection element (not represented) can be mounted on the second support element in the form of a pin. This connection element makes it possible to mount the device on a wall or a ceiling, while using an identical or almost identical end-plate for the two embodiments. The connection element is, for example, a bent element.

Each lateral element 7, 7' produced in end-plate form also comprises the support elements mentioned, and elements 14 for masking and protecting the lateral parts of the winding, and possibly for guiding the latter in the case where an obstacle comes to modify the correct operation of the winding.

The motor end-plate also comprises, in the bore emerging on its outer face, a first guiding path 77 to store therein, for example, an antenna wire. This first guiding path can take the form of pins arranged facing one another and between which a part of the antenna cable can be wedged.

The inner face of the motor end-plate is hollowed and comprises, in addition to the reinforcing walls 78, also a second guiding path 79 between the first support element and the second support element. The inner face and the outer face are connected to one another, through a through hole 80 emerging from the inner face in the bore of the inner face. The through hole emerges outside the diameter of the housing of the actuator. This second guiding path makes it possible to accommodate a power supply wire (not represented), for example arriving along the torque recovery bar from the power supply device arranged at the other end of the winding tube, to the actuator, or arriving from a suspended ceiling along the second support. The power supply wire is then inserted through the through hole to the bore of the motor end-plate and can be connected to the electronic card or to the actuator through the bore of the support shaft.

The inner face of the end-plate also comprises an annular surface 81, on which, during mounting, the collar of the crown ring used as bearing bears on the winding tube. The surface condition and/or the small dimensions of this annular surface make it possible to minimize friction during operation.

The invention also applies in the context of a moving element that cannot be wound on the tube, for example a blind of inverted type, of folded or ruffled type, the beads of which are wound on a shaft driven by the actuator, for example on a tube containing the power supply device. It also applies in the context of a screen of hinged type (shutter or gate), the power supply device of which would be housed in an actuation tube, for example a tube positioned at the level of the hinge pins.

The invention claimed is:

1. A motorized manoeuvring device intended to manoeuvre a moving windable fabric screen, the motorized manoeuvring device comprising:
    an actuator, comprising a hollow housing containing a gear motor,
    a mounting end-plate having an outer lateral face and an inner lateral face opposed to the outer lateral face,
    wherein the end-plate comprises a first support extending from the inner lateral face of the end-plate along a first longitudinal axis and cooperating with the hollow housing of the actuator, and
    a second support extending from the end-plate along a second axis distinct from the first longitudinal axis,
    wherein the first support has a shafted part comprising at least one first rotation stopping element formed on an outer wall of the shafted part, and the hollow housing has a part forming a recess comprising at least one second rotation stopping element formed on an inner wall of the hollow housing,
    wherein the at least one first rotation stopping element and the at least one second rotation stopping element cooperate to link in rotation the first support and the hollow housing,
    wherein the at least one first rotation stopping element and the at least one second rotation stopping element are oriented along the first longitudinal axis,
    wherein the hollow housing of the actuator is closed by the first support,
    wherein the end-plate comprises a bore that opens on the outer lateral face and a removable cover configured to close the bore while permitting access to the bore when the cover is removed,
    wherein the end-plate comprises a guiding path positioned on the inner lateral face, the guiding path being configured for guiding a wire,
    wherein the end-plate comprises at least one selected from the group consisting of:
    a rail configured for guiding an electronic card inside the bore, the bore having a through hole in the first support shaft configured for connecting a wire from the electronic card to a motor side of the end-plate through the first support shaft,
    an electronic card accessible inside the bore by removing the cover, the bore having a through hole in the first support shaft configured for connecting a wire from the electronic card to a motor side of the end-plate through the first support shaft,
    an additional guiding path configured for guiding a wire positioned on a bottom face of the bore, the bore having a through hole in the first support shaft configured for connecting the wire from the additional guiding path to a motor side of the end-plate through the first support shaft, and
    a through hole connecting the guiding path on the inner lateral face of the end-plate with an inner face in the bore.

2. The motorized device according to claim 1, wherein the end-plate, the first support and the second support are formed as a unitary piece.

3. The motorized device according to claim 1,
wherein the first support is at least partially inserted into the hollow housing of the actuator.

4. The motorized device according to claim 1,
wherein the second support is configured to cooperate with a torque neutralizing element acting by interaction with the fabric screen.

5. The motorized device according to claim 1,
wherein the second support is configured to cooperate with a frame on an axis substantially at right angles to the first longitudinal axis of the first support.

6. The motorized device according to claim 1,
wherein the end-plate bore comprises a first bore having a first cross-section and configured to receive at least one of a connection and an electronic part of the actuator, the first bore being located inside the first support, and a second bore having a second cross-section different from the first cross-section and opening on the outer lateral face and configured to be closed by the cover, wherein the first bore and the second bore are connected to one another.

7. The motorized device according to claim 6,
wherein the end-plate comprises a through hole between the second bore and the inner lateral face, the hole emerging outside a diameter of the hollow housing of the actuator and being configured for entry of a cable.

8. The motorized device according to claim 6,
wherein the end-plate comprises an additional guiding path configured for guiding an electrical wire positioned on a bottom face of the second bore.

9. The motorized device according to claim 1,
wherein the end-plate comprises an electrical wire arranged in the guiding path.

10. The motorized device according to claim 1,
wherein the second support extends from the inner lateral face of the end-plate.

11. The motorized device according to claim 1,
wherein the motorized device comprises an annular surface on the inner lateral face of the end-plate against which a bearing ring bears, wherein the bearing ring is mounted to rotate freely about the hollow housing of the actuator.

12. A motorized home automation system, comprising the motorized device according to claim 1,
a bearing ring rotating freely on the hollow housing of the actuator, and
a winding tube, mounted to slide on the bearing ring,
wherein the bearing ring bears on the inner lateral face of the end-plate and a second end-plate comprising a support element for the winding tube.

13. The motorized device according to claim 1,
wherein the hollow housing of the actuator is tubular.

14. The motorized device according to claim 1,
wherein the at least one first rotation stopping element includes at least one selected from the group consisting of (i) at least one first groove and (ii) at least one first rib, and the at least one second rotation stopping element includes at least one selected from the group consisting of (i) at least one second groove and (ii) at least one second rib.

15. The motorized device according to claim 1,
wherein the first rotation stopping element and the second rotation stopping element cooperate to link in rotation the first support and the hollow housing about the first longitudinal axis.

16. The motorized device according to claim 1, wherein the hollow housing of the actuator is slidingly mounted on the shafted part.

17. The motorized device according to claim 1, wherein the hollow housing of the actuator is fixed in position relative to the shafted part.

18. The motorized device according to claim 6, comprising at least one rail configured for guiding an electronic card inside the first bore.

19. The motorized device according to claim 6, comprising an electronic card accessible from the second bore by removing the cover.

20. The motorized device according to claim 9, wherein the electrical wire is arranged in the guiding path and the additional guiding path.

21. The motorized device according to claim 20, wherein the wire is connected to at least one selected from the group consisting of (i) the actuator and (ii) an electronic card inside the first bore.

22. The motorized device according to claim 1,
wherein the end-plate comprises a through hole between the bore and the inner lateral face, the hole emerging outside a diameter of the hollow housing of the actuator and being configured for entry of a cable.

23. The motorized device according to claim 22,
wherein the end-plate comprises an additional guiding path configured for guiding an electrical wire positioned in the bore.

24. The motorized device according to claim 23, comprising a wire passing through the hole and arranged in the guiding path and the additional guiding path.

25. The motorized device according to claim 1, wherein the bore extends within the support shaft and an inner wall of the bore is provided with at least one rail configured for guiding an electronic card.

26. The motorized device according to claim 25, comprising an electronic card accessible from the bore by removing the cover.

27. The motorized device according to claim 1, comprising an additional guiding path configured for guiding a wire positioned on a bottom face of the bore, wherein the additional guiding path comprises pins arranged facing one another so that a wire can be wedged between the pins.

28. The motorized device according to claim 1, wherein the guiding path extends on the inner face of the end-plate and on the second support.

* * * * *